US008326859B2

(12) United States Patent  
Paek et al.

(10) Patent No.: US 8,326,859 B2  
(45) Date of Patent: Dec. 4, 2012

(54) TASK PREDICTION (75) Inventors: Timothy S. Paek, Sammamish, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 12/610,392

(22) Filed: Nov. 2, 2009

(65) Prior Publication Data

US 2011/0107242 A1    May 5, 2011

(51) Int. Cl.
    *G06F 17/30* (2006.01)
(52) U.S. Cl. ...................................................... 707/767
(58) Field of Classification Search .................. 707/759, 707/797, 766, 767, 999.006, 999.101, 999.102; 715/257; 704/9

See application file for complete search history.

(56) References Cited

U.S. PATENT DOCUMENTS

| 7,360,171 | B2 | 4/2008 | Ruthfield et al. |
| 7,548,915 | B2* | 6/2009 | Ramer et al. ............... 705/14.54 |
| 7,809,744 | B2* | 10/2010 | Nevidomski et al. ......... 707/759 |
| 7,818,332 | B2* | 10/2010 | Olds et al. ..................... 707/759 |
| 2006/0248078 | A1 | 11/2006 | Gross et al. |
| 2007/0100799 | A1 | 5/2007 | Rose et al. |
| 2007/0100915 | A1* | 5/2007 | Rose et al. .................... 707/205 |
| 2009/0019002 | A1 | 1/2009 | Boulis |
| 2009/0083232 | A1 | 3/2009 | Ives et al. |
| 2009/0171929 | A1 | 7/2009 | Jing et al. |
| 2011/0202876 | A1* | 8/2011 | Badger et al. ................. 715/816 |

OTHER PUBLICATIONS

Singh, Satbir, "Google Auto Suggest Now Saves you Lot of Clicks", Retrieved at <<http://www.technotraits.com/2009/05/google-auto-suggest-now-saves-you-lot-of-clicks/>> May 20, 2009, pp. 1-5.
Warmington, Alistair, "Assign Shortcuts to the Direction Keys", Retrieved at <<http://www.knowyourmobile.com/samsung/samsungx820/samsungx820userguides/237/assign_shortcuts_to_the_direction_keys.html>>, Mar. 13, 2007, pp. 1-2.
"Mobile Search Just Got a Lot Easier", Retrieved at <<http://mobile.yahoo.com/onesearch/shortcut>> Jul. 7, 2009, p. 1.
Slawski, Bill, "Predictive Search Query Suggestions", Retrieved at http://www.seobythesea.com/?p=1375>> May 8, 2009, pp. 1-13.
Li, X. et al.; "Learning Query Intent from Regularized Click Graphs"; Proceedings of the 31$^{st}$ Annual International ACM SIGIR Conference on Research and Development in Information Retrieval; Singapore; 2008; pp. 339-346.

* cited by examiner

*Primary Examiner* — Marc Filipczyk (57) ABSTRACT

This patent application pertains to computing scenarios that allow users to more readily accomplish desired tasks. One implementation includes at least one dictionary of potential auto-suggestions that can be generated in relation to user-input. The implementation also includes a text framework configured to weight at least some of the potential auto-suggestions based upon one or more parameters. This implementation further includes a task engine configured to associate tasks with at least some of the potential auto-suggestions.

20 Claims, 5 Drawing Sheets

TASK PREDICTION

BACKGROUND

Presently, users of various computing devices can enter words as text through a keyboard of some type. Entering words on traditional computing devices that have a comfortable keyboard is relatively easy. However, many types of computing devices, such as cell phones, smart phones, and personal digital assistants (PDAs) have very limited keyboard space. Typing letters or symbols to generate a word or phrase on such devices leaves much to be desired.

Often, for a user to accomplish a particular goal or task, a substantial number of incremental steps or user-input is necessary. For instance, the user may begin by typing letters or words upon which the computing device can offer several options. The user can evaluate the options in light of his/her goal and enter additional input. Often, additional options can be presented to the user and the user can again evaluate the options in-light of his/her end goal. This process can be repeated multiple times until eventually the user is able to achieve the goal. This process can be time consuming, require multiple physical steps and/or multiple mental evaluations by the user.

SUMMARY

This patent application pertains to computing scenarios that allow users to more readily accomplish desired tasks or goals. One implementation includes at least one dictionary of potential auto-suggestions that can be generated in relation to user-input. The implementation also includes a text framework configured to weight at least some of the potential auto-suggestions based upon one or more parameters. This implementation further includes a task engine configured to associate tasks with at least some of the potential auto-suggestions.

The above listed implementations are provided for introductory purposes and do not include all of and/or limit the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

Figure 1:
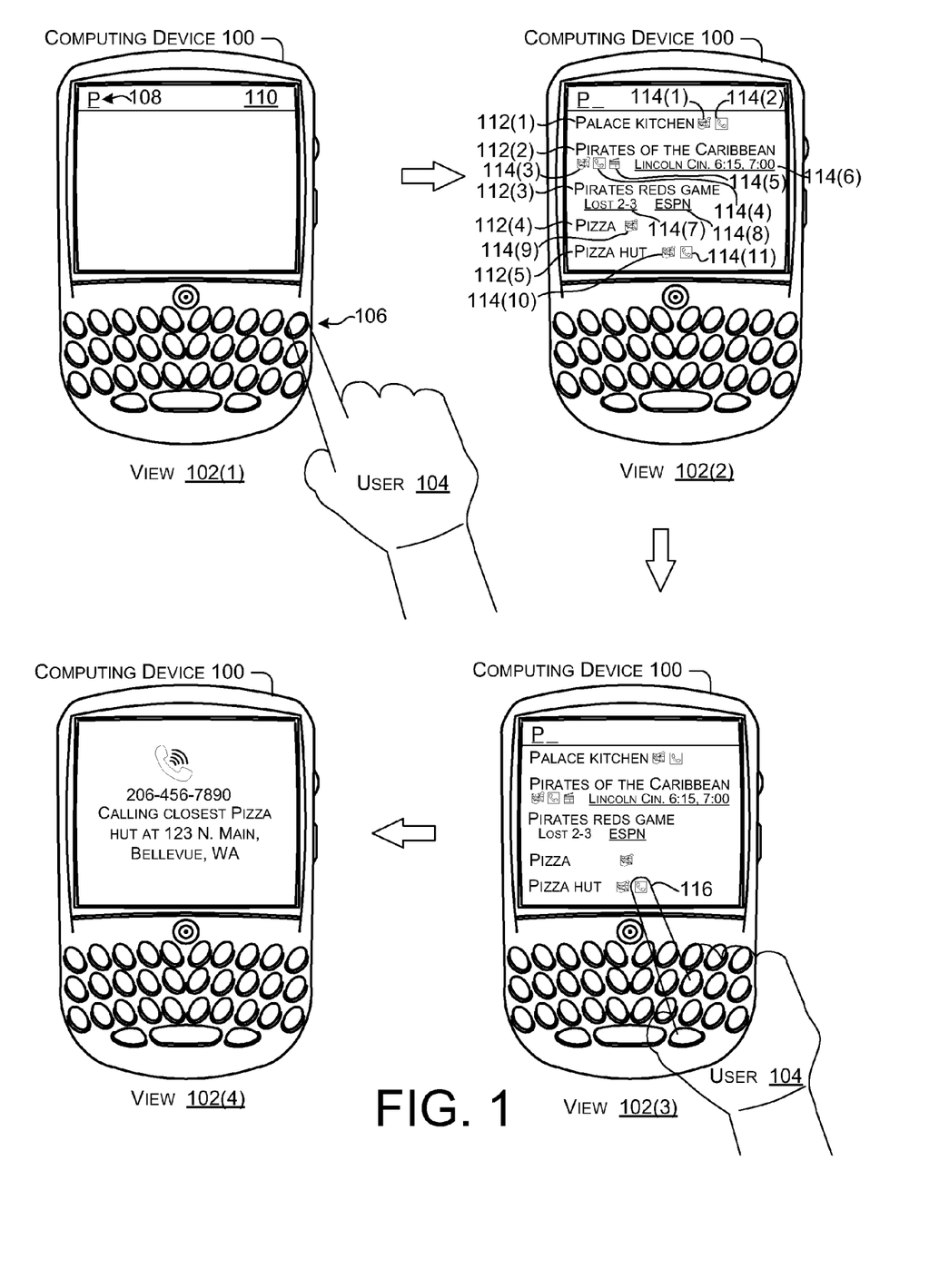
FIGS. 1 and 4 illustrate computing devices upon which task prediction concepts can be implemented in accordance with some of the present concepts.

This patent application pertains to computing scenarios that allow users to more readily accomplish desired tasks. For introductory explanation purposes consider a computing scenario associated with FIG. 1 that shows a computing device 100. In this case, FIG. 1 shows four sequential views 102(1)-102(4) of computing device 100. In this example, assume that a user 104 desires to call the nearest Pizza Hut® to order a pizza. Stated another way, the user's intent or goal is to accomplish the task of calling the nearest Pizza Hut. Toward this end, in view 102(1) user 104 enters a query in the form of the letter "P" on computing device 100 as indicated at 106. The letter "P" is then populated at 108 in a user-input region 110 on a user-interface of the computing device 100.

Computing device 100 can process the user-input and predict user-intent from the user-input. This process will be described in more detail below. Briefly, in this implementation, the predicting can include identifying potential auto-suggestions or auto-suggestion matches for completing the user's text entry and determining tasks that can be associated with individual auto-suggestions. Such an example can be seen in view 102(2) where five auto-suggestions 112(1)-112(5) are presented for the user. Further, view 102(2) can present user-selectable graphics 114(1)-114(11) associated with individual auto-suggestions. The user-selectable graphics can be thought of as shortcuts or quick-links that can allow the user to accomplish his/her desired or intended task. User-selectable graphics can be icons, selectable text, canvases and/or some other item or indicia that can be selected by the user to cause a further action. Auto-suggestions 112(1)-112(5) and user-selectable graphics 114(1)-114(11) are designated with specificity in view 102(2), but not in view 102(3) to allow the user to better visualize an actual potential appearance of computing device 100.

In this example, user-selectable graphics 114(1) and 114(2) are associated with auto-suggestion 112(1), user-selectable graphics 114(3) through 114(6) are associated with auto-suggestion 112(2), user-selectable graphics 114(7) and 114(8) are associated with auto-suggestion 112(3), user-selectable graphic 114(9) is associated with auto-suggestion 112(4), and user-selectable graphics 114(10) and 114(11) are associated with auto-suggestion 112(5).

More specifically, in this case, auto-suggestion 112(1) is the phrase "Palace Kitchen". User-selectable graphic 114(1) is in the form of a map icon that relates to the location of the Palace Kitchen. Thus, if the user-intent was to find a map to the Palace Kitchen then he/she can click on or select user-selectable graphic 114(1) to accomplish this task. It is worth noting that in such a scenario, the user can accomplish the intended task by entering the letter "p" and then clicking user-selectable graphic 114(1) without any intervening user-input. Selecting as used herein can be accomplished by touching a touchpad of the computing device, using a mouse, verbal command, and/or other technique.

User-selectable graphic 114(2) is in the form of a telephone icon that relates to calling the Palace Kitchen. If the user-intent was to call the Palace Kitchen then he/she can click on user-selectable graphic 114(2) to accomplish this task.

Auto-suggestion 112(2) is the phrase "Pirates of the Caribbean"(®). Associated user-selectable graphic 114(3) is in the form of a map icon. Associated user-selectable graphic 114(4) is in the form of a telephone icon. Associated user-selectable graphic 114(5) is in the form of a tickets icon. The user can purchase movie tickets to Pirates of the Caribbean simply by clicking on the tickets icon. Associated user-selectable graphic 114(6) is in the form of text (i.e., a canvas) specifying a nearby cinema (e.g., Lincoln Center Cinema) that is playing the movie along with start times (e.g., 6:15 and 7:00). If the user-intent was to find a theater to go see this movie and/or to discover start times for this movie, then the task is already satisfied. User-selectable graphic 114(6) can also function as a link to a web-site associated with this theater if desired by the user.

Auto-suggestion 112(3) is the phrase "Pirates vs. Reds game". Associated user-selectable graphic 114(7) is in the form of text that specifies the score. If the user's intent was to find the score then the task is satisfied. The user can obtain additional details by clicking on (or otherwise selecting) user-selectable graphic 114(7). Associated user-selectable graphic 114(8) is in the form of an icon for ESPN®. If the user's intent was to view video highlights of the game the user can click on the ESPN link to obtain the highlights and/or further details.

Auto-suggestion 112(4) is the phrase "Pizza". Associated user-selectable graphic 114(9) is a map icon that can show pizzerias that are in geographical proximity to computing device 100.

Auto-suggestion 112(5) is the phrase "Pizza Hut". Associated user-selectable graphic 114(10) is a map icon that can show locations of one or more geographically proximate Pizza Huts. Associated user-selectable graphic 114(11) is a telephone icon. In this case, the user's goal was to call the closest Pizza Hut. Accordingly, the user is shown selecting user-selectable graphic 114(11) in view 102(3) as indicated at 116. Responsive to this selection, view 102(4) shows computing device 100 calling the "Closest Pizza Hut at 123 N. Main, Bellevue Wash.". In summary, in this example, the user simply started entering text in view 102(1) that could correspond to the user's intended task. Auto-suggestions for completing the text entry and associated task short-cuts were presented to the user so that the user could complete the intended task with a single additional action (in this case indicated at 116). Accordingly, the present implementations are able to successfully predict user-intent associated with user-entry 106 and to allow the user to accomplish that intent with fewer steps (potentially a single step) than existing technologies.

First Task Prediction System Example

Figure 2:
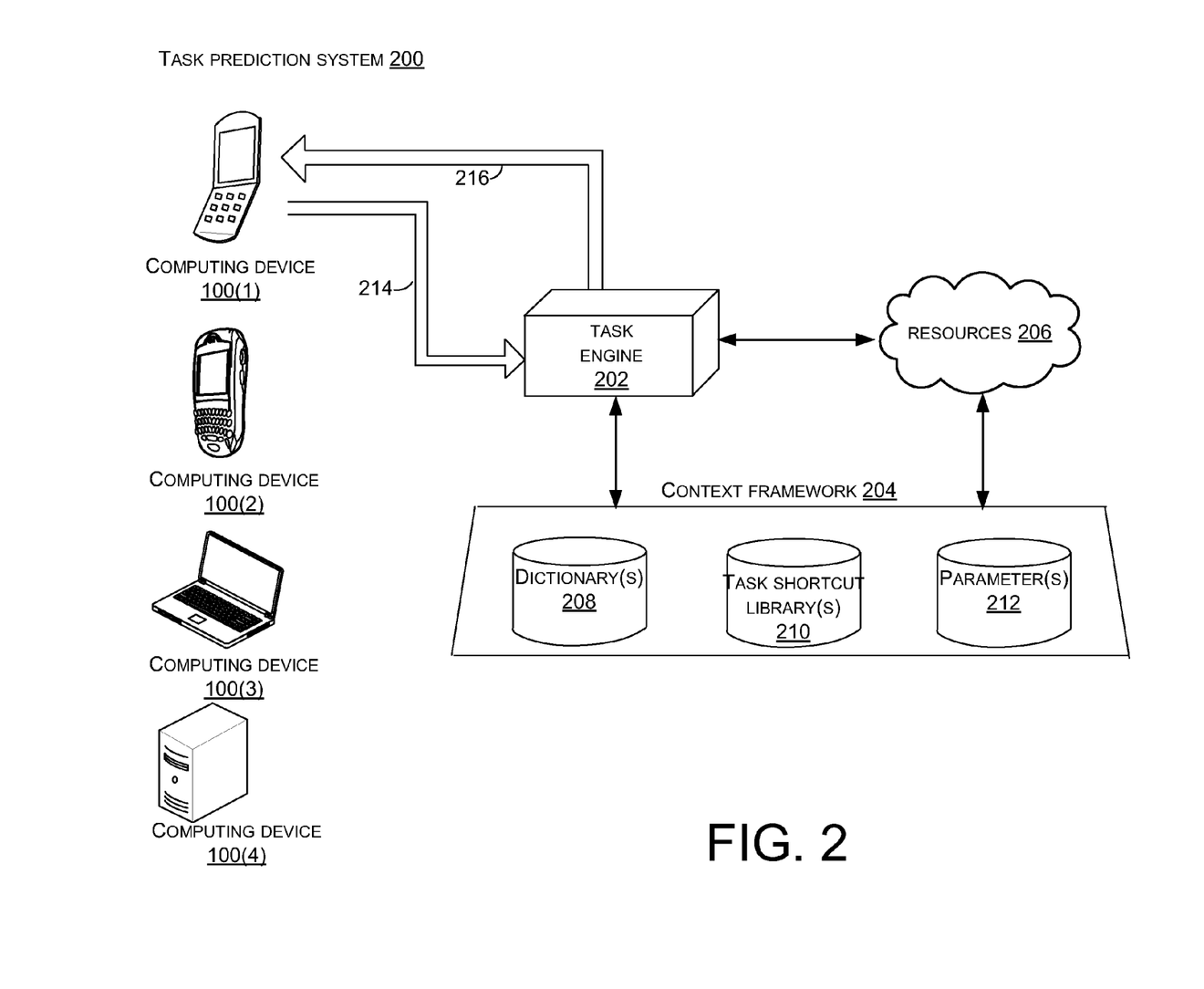
FIGS. 2 and 3 illustrate task prediction systems in which task prediction concepts can be implemented in accordance with some of the present concepts.

FIG. 2 shows an example task prediction system 200. In this case, the system includes four different computing devices designated as 100(1)-100(4). Here, computing device 100(1) is manifested as a Smartphone, computing device 100(2) is manifested as a personal digital assistant (PDA), computing device 100(3) is manifested as a notebook computer, and computing device 100(4) is manifested as a desktop computer. Multiple computing devices are shown to indicate that the present concepts can be applied to many different types of existing and/or yet to be developed computing devices. Task prediction system 200 further includes a task engine 202, a context framework 204, and can include (and/or interface with) resources 206 (local and/or networked resources). Context framework 204 can include one or more dictionary(s) 208, task shortcut library(s) 210, and parameter(s) 212.

User-input can be received on any of computing devices 100(1)-100(4) and forwarded to task engine 202 at 214. For purposes of explanation, assume that user-input is received on computing device 100(1) and forwarded to task engine 202. Briefly, from one perspective the task engine can access the context framework 204 to accomplish two functions. First, the task engine can identify potential auto-suggestion options for the received user-input. Next, the task engine can determine potential tasks that the user may be attempting to accomplish with the user-input. Task engine 202 can return the identified potential auto-suggestion options and associated potential task shortcuts for accomplishing the tasks to computing device 100(1) as indicated at 216.

More specifically, task engine 202 can obtain potential auto-suggestion matches for the user-input by accessing dictionary(s) 208. Potential auto-suggestions can be obtained from the dictionary(s). The potential auto-suggestions can be ranked according to the one or more parameters 212. The parameters can relate to previous user-input (i.e., user's history), previous input by other users, user preferences, geography, and/or monetization, among others. Some of these parameters can be thought of as dynamically adjustable parameters that can be adjusted by the user, adjusted based upon user-input, adjusted by the input of other users, and/or adjusted based upon location changes, among others. Parameters that can be adjusted by the user can be adjusted by the user on the go and/or can be predefined by the user.

The user's history parameter is rather self explanatory. For instance, if the last time the user enter "pi" the user selected the auto-suggestion "pizza" then the user is likely to make the same selection this time. The previous user-input by others parameter relates to the behavior of other users. For instance, if 100,000 previous user-inputs resulted in 60,000 selections of "pizza" and only 10,000 of "pirates" then pizza can be ranked higher for that parameter.

The user preferences parameter relates to rankings that the user has given to particular search genre/venue or other criteria. For instance, if the user ranks sports high and entertainment low, then that parameter can indicate that the user-input "pi" may relate to the baseball team the "Pirates" rather than the move "Pirates of the Caribbean". In summary, some implementations can allow the user to adjust a relative importance of individual venues so as to customize the auto-suggestions and/or task shortcuts that are presented to the user.

The geographical parameter is generally self-evident. The location of the computing device can be considered as a parameter for ranking the potential auto-suggestions. Geographical information, such as location, may be rather static on desktop computing device 100(4) yet be rather dynamic on a more mobile device, such as computing devices 100(1)-100(3) that may have the capability to continually or periodically determine their location and report it to context framework 204.

The monetization parameter reflects whether a party or entity has paid (or will) pay to have their potential auto-suggestion ranked higher. For instance, Taco Time® may pay to have the auto-suggestion "Taco Time" be ranked higher than "Taco Bell"®, given a user-input of "ta" for instance.

For the potential auto-suggestions identified via dictionary(s) 208 and parameter(s) 212, the task engine 202 can select likely task shortcuts that can be provided for the user by accessing task shortcut library(s) 210.

In a similar manner to the auto-suggestion options, task shortcuts can be selected from the task shortcut library(s) 210 based upon parameter(s) 212. For instance, if many users that type "pi" end up using their computing device to call Pizza Hut, then a phone icon (to make such a call) can be associated with the Pizza Hut auto-suggestion for the computing device. Similarly, if users that typed "pi" often ended up buying movie tickets online to "Pirates of the Caribbean" then a ticket buying icon can be associated with the Pirates of the Caribbean auto-suggestion.

For ease of explanation in the above discussion, task engine 202 and context framework 204 are treated as though they are external to computing device 100(1). However, such need not be the case, and either or both of the task engine and/or context framework can be resident on the computing device. For instance, the task engine can be local to computing device 100(1) and the context framework can be remote from computing device 100(1), such as on a server (not shown). In still other cases, the task engine 202 can be local to computing device 100(1) along with a limited amount of the context framework occurring in a local cache of the computing device. The remainder of the context framework can be maintained remotely and accessed on an as needed basis and/or to refresh the local cached content. One such configuration is discussed in more detail relative to FIG. 3.

In the above described implementation, task engine 202 can accomplish two serial functions. First, the task engine can identify potential auto-suggestion options for the received user-input. Next, the task engine can determine potential tasks that the user may be attempting to accomplish with the received user-input. Task engine 202 can return the identified potential auto-suggestion options and associated potential task shortcuts to computing device 100(3), as indicated at 216. In other implementations, the task engine 202 may utilize the user-input as a means for determining the user's intent and attempt to present ways for the user to accomplish his/her intent with a reduced number of user-actions. Stated another way, given a user-input and various parameter values, the task engine can predict the user's intent and present shortcut(s) (i.e., task shortcuts) for accomplishing that intent.

Second Task Prediction System Example

Figure 3:
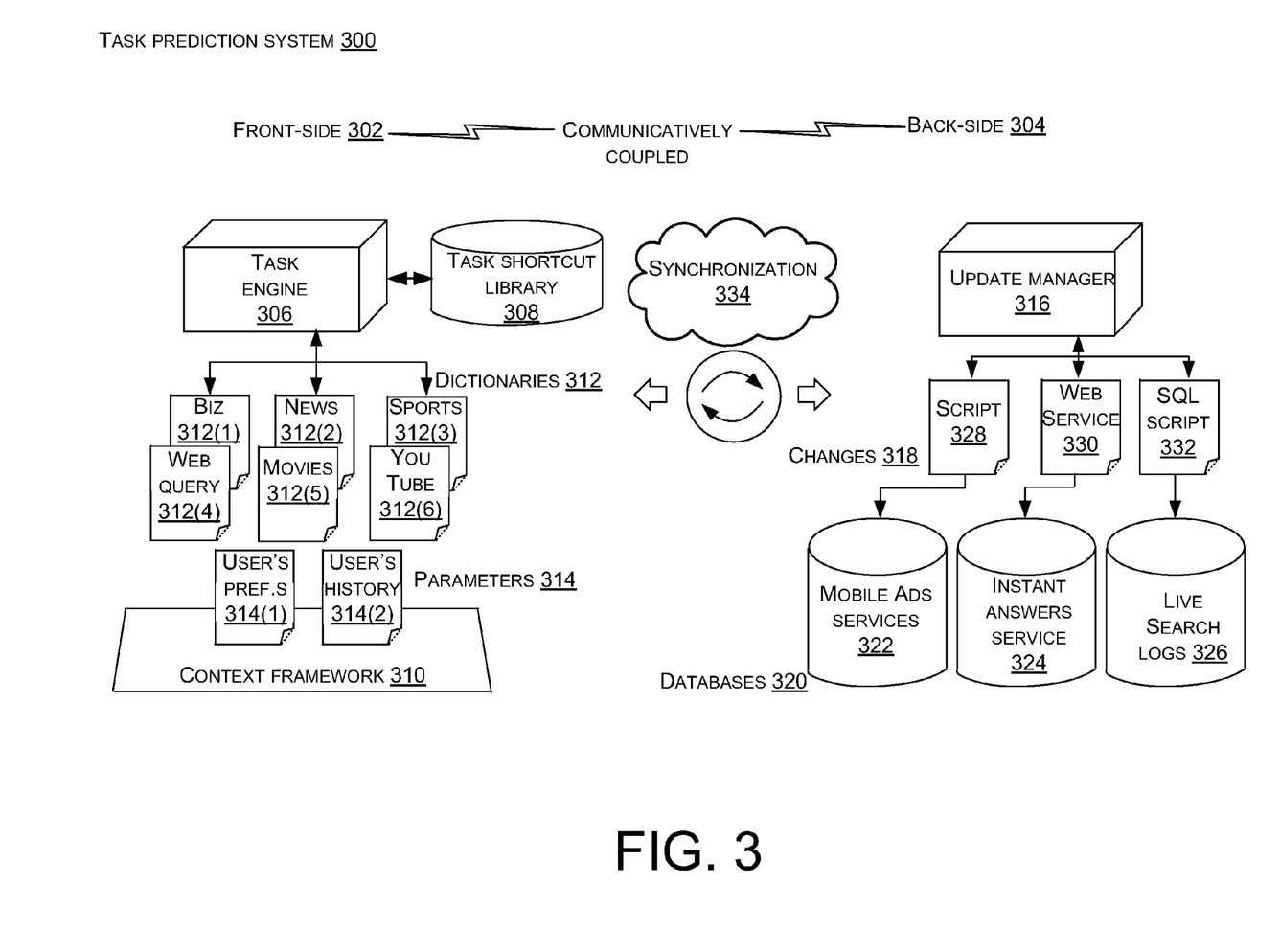

FIG. 3 shows another example task prediction system 300. For ease of explanation, the components and/or techniques of task prediction system 300 are explained in terms of front-side 302 and back-side 304. The front-side and back-side can be communicatively coupled; either continuously, periodically, or from time to time.

In many configurations, front-side 302 can be performed on a computing device configured in a client role, such as those illustrated in FIG. 2, while the back-side can be performed by a server computer or on a cloud. Other configurations can also be implemented, such as where front-side and back-side occur on the same computing device.

On the front-side 302, the task prediction system 300 includes task engine 306, a task shortcut library 308, and context framework 310. The context framework includes dictionaries 312 and parameters 314. In this example, the dictionaries 312 are topic or venue specific and include a business (biz) dictionary 312(1), a news dictionary 312(2), a sports dictionary 312(3), a web query dictionary 312(4), a movies dictionary 312(5) and a YouTube® dictionary 312(6). Parameters 314 include user's preferences parameter 314(1) and user's history parameter 314(2).

Some configurations can allow the user to select, rank, and/or define conditions associated with individual dictionaries. For instance, the user may be able to select or include particular dictionaries for consideration by the task engine. For instance, the user could specify that the task engine not even consider auto-suggestions in sports dictionary 312(3).

In another example, users can download or otherwise cause a dictionary, such as a "ring tones" dictionary (not shown), to be utilized by the task engine 306 as one of the defined conditions. The first time that the user clicks on an auto-suggestion or associated task shortcut from that dictionary, a payment screen can be presented to the user. The user can enter credit card or other payment information into the payment screen and agree to have fast easy downloads according to these additional conditions.

In another case, the user can pre-define conditions to be applied with individual dictionaries. For instance, assume that the user selects the ring tones dictionary to be included in the dictionaries 312 to be considered by the task engine 306. The ring tones dictionary could contain all ring tone options that are available to the user. The user can predefine conditions such that in an instance where the task engine lists auto-suggestions and/or associated tasks from the ring tone dictionary that upon user selection of a ring tone auto-suggestion or task shortcut, that the task engine should cause the selected ring tone to be automatically paid for.

In this latter example, as part of the conditions, the user can enter credit card information that is stored in user preferences 314(1). Upon selection of a ring tone from the ring tone dictionary, the task engine can pay for use of the selected ring tone utilizing the stored payment information without further effort on the part of the user.

Back-side 304 can include an update manager 316 that can obtain changes 318 from various databases 320. The databases may be under the control of the update manager and/or may be obtained from various content providers, among others. For instance, update manager 316 can access databases associated with the content providers to obtain the content changes. This example includes a mobile advertisement (Ads) service(s) database 322, an instant answers service(s) database 324, and a live search logs database 326. Changes from these respective databases 320 are reflected as script changes 328, web-service changes 330, and Structured Query Language (SQL) service script changes 332.

In this example, task shortcut library 308, dictionaries 312, and parameters 314 can be cached locally on a client computing device. Upon receipt of user-input on the computing device, task engine 306 can access one or more of these components and generate auto-suggestions and associated task shortcuts from this cache. In some instances, task engine 306 may communicate with update manager 316 over a network to obtain additional information.

In configurations that cache task shortcut library 308, dictionaries 312, and parameters 314, the update manager 316 can coordinate synchronization 334 of the cache. Synchronization 334 can be performed periodically and/or on an as-needed basis. In some implementations, synchronization 334 can be thought of as a process by which the user's parameters (i.e., user's preferences 314(1) and/or user's history 314(2)) are combined with external parameters or factors from update manager 316. The synchronized parameters can be utilized by task engine 306 to rank auto-suggest options and/or to rank associated task shortcuts for the user.

Figure 4:
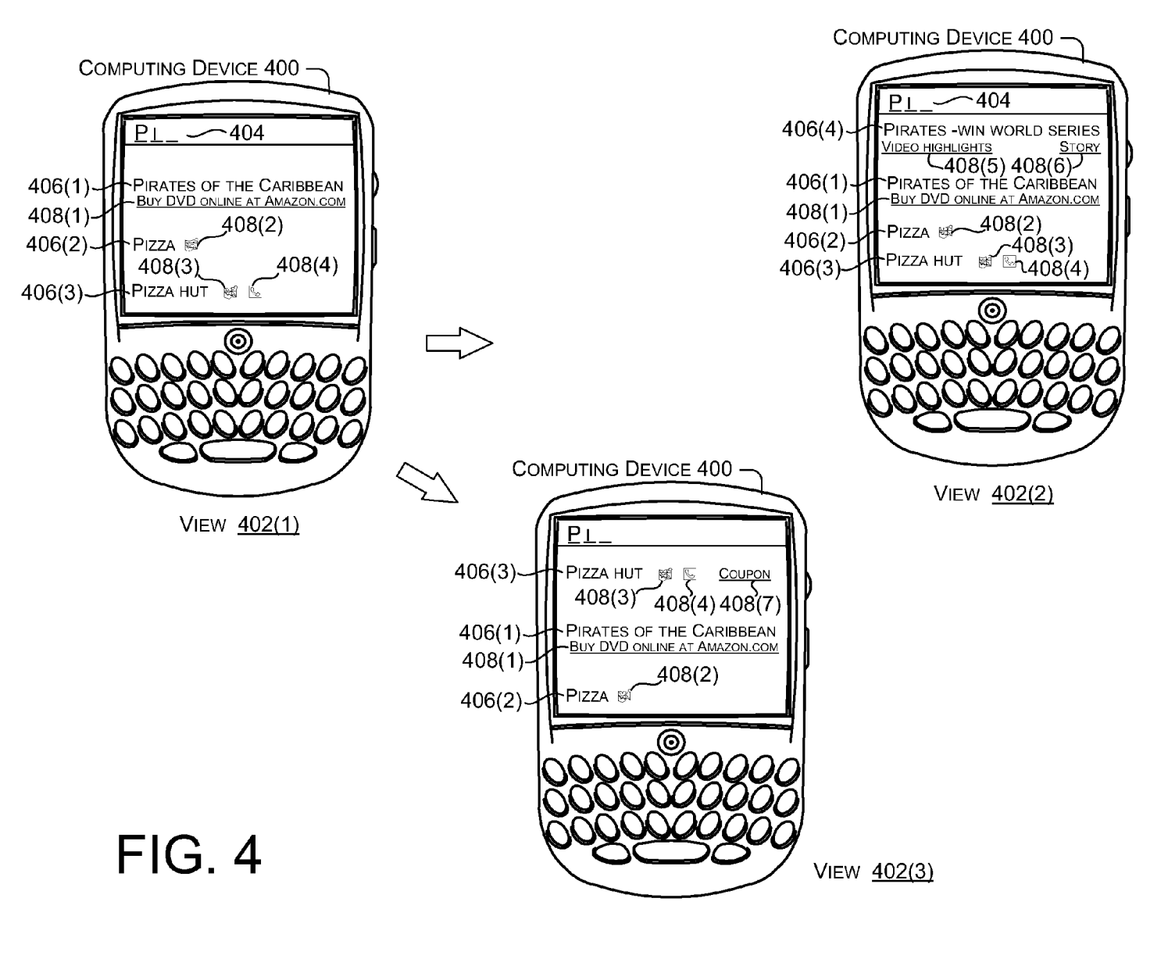

For purposes of explanation regarding back-side to front-side synchronization 334, please consider FIGS. 3-4 collectively. FIG. 4 shows a computing device 400 in three different views 402(1), 402(2), and 402(3). Starting with view 402(1), assume that front-side 302 exists on computing device 400 and back-side 304 is remote, such as on a network server. Also, assume that a user of computing device 400 has entered input text "pi" as indicated at 404. Further, assume that responsive to user-input 404, three auto-suggestions 406(1), 406(2), and 406(3) are presented to the user along with associated task shortcuts 408(1), 408(2), 408(3) and 408(4). Auto-suggestion 406(1) is the term "Pirates of the Caribbean", auto-suggestion 406(2) is the term "pizza" and auto-suggestion 406(3) is the term "Pizza Hut". Task shortcut 408(1) is associated with auto-suggestion 406(1) and is a selectable text graphic that reads "buy the DVD online at Amazon.com" (Amazon.com is a registered trademark). Task shortcut 408(2) is associated with auto-suggestion 406(2) and is a selectable graphic in the form of an icon that will show the user a map of pizzerias in the user's proximity. Task shortcuts 408(3) and 408(4) are in the form of icons that are associated with auto-suggestion 406(3). Task shortcut 408(3) will show the user a map of Pizza Hut(s) in the user's proximity. Task shortcut 408(4) allows the user to call the closest Pizza Hut.

Assume that view 402(2) is generated subsequently to view 402(1) shortly after the Pittsburg Pirates® win the World Series®. View 402(2) reflects auto-suggestion and task shortcuts changes that can result when synchronization 334 occurs soon thereafter. In this case, the top-listed (i.e., highest ranking) auto-suggestion for user-input "pi" is now "Pirates—Win World Series" as indicated at 406(4). Further, two task shortcuts 408(5) and 408(6) are associated with auto-suggestion 406(4). Task shortcut 408(5) can present video highlights of the win upon user selection. Similarly, task shortcut 408(6) can present the corresponding story upon user selection.

This change in auto-suggestions and/or associated task shortcuts evidenced in view 402(2) can be brought about when update manager 316 picks up changes in the behavior of other users. For instance, assume that a large number of users start selecting auto-suggestions relating to the Pirates World Series win. These changes can be picked up by the update manager 316 and reflected in the front-side cached dictionaries 312 as a result of the synchronization process 334. In a similar manner to the auto-suggestion changes that can result from updating the dictionaries 312, the update manager can also track the endpoint of users that selected the auto-suggestion option of "Pirates—Win World Series". For instance, if users clicked on the auto-suggestion option to go to a web-site and ultimately viewed video highlights of the game, then the update manager 316 can relay this information to the task shortcut library 308 as part of the synchronization process.

Thus, in view 402(2) when task engine 306 receives user-input "pi" the task engine can predict that the highest probability is that the user intended to view either video highlights or a textual story related to the Pirates win. As such, an auto-suggestion for "Pirates—Win World Series" 406(4) can be displayed highest (i.e., first) on the computing device 400 along with associated task shortcuts 408(5) and 408(6) that allow the user to view highlights or a story, respectively, with a single click.

View 402(3) shows results in an alternative synchronization scenario. Assume in this case that Pizza Hut decides to run a promotional campaign intended to increase web-originated sales of Pizza Hut food and beverages. In such a scenario, Pizza Hut may make a contractual relationship regarding how the term "Pizza Hut" is treated by task engine 306. For instance, Pizza Hut could pay to influence how the term "Pizza Hut" is ranked in the auto-suggestion process (i.e., increase its relative ranking). Such an example can be seen in view 402(3) where the auto-suggestion for "Pizza Hut" is shown first (i.e., highest) rather than third in view 402(1). Alternatively or additionally, Pizza Hut could pay to influence the task shortcuts that are listed with the "Pizza Hut" auto-suggestion. For instance, view 402(3) includes task shortcuts 408(3) and 408(4) and an additional task shortcut 408(7) for a coupon. Pizza Hut could pay for user's clicking on the "Pizza Hut" auto-suggestion 406(3) or task shortcuts 408(3), 408(4) and 408(7). Pizza Hut could also pay on an end use basis. For instance, if a user clicks on the coupon task shortcut 408(7) and ultimately redeems the coupon as part of purchasing a pizza, then Pizza Hut is charged a given amount.

It is also worth noting that synchronization 334 can reflect different parameters that allow the synchronization to be customized to computing device 400. Stated another way, the synchronization can reflect the system's learned user preferences—i.e., the system can watch what the user tends to click on and then can automatically adjust its ranking. In some examples, the synchronization can reflect user's preferences parameter 314(1), user history parameter 314(2) and/or other parameters 314. For instance, if the user preferences rank sports very low, then the first place ranking of the "Pirates—Win World Series" auto-suggestion 406(4) of view 402(2) may be different and/or not even cached on computing device 400 as part of the synchronization process. In a further example, if the user (i.e., computing device 400) is in a region that does not contain any Pizza Hut restaurants then the synchronization may not include the above described Pizza Hut information from mobile ads services database 322.

The examples described relative to views 402(2) and 402(3) can be thought of as temporally significant in that the auto-suggestion options and task shortcuts presented to the user depend upon specific temporal events. In the example of view 402(2) the temporal event is the Pirates winning the World Series. Stated another way, it is more likely that 15 minutes after the game that a user typing "pi" is more interested in the results of the game than the same user entering the same input six months later. View 402(3) is temporally significant in that the results are tied to the duration of the Pizza Hut promotion. In another configuration, synchronization 334 may be generic to front-side 302 of any or all computing devices. The auto-suggestions and/or associated task shortcuts generated on an individual computing device can be customized based upon weighting caused by front end parameters 314 as applied by task engine 306 and/or context framework 310.

In summary the present implementations can offer auto-suggestions and/or task shortcuts to allow a user to easily accomplish a desired goal. The auto-suggestions and/or task shortcuts can be based upon any combination of the user's previous history, user defined preferences, and external factors, among others.

Exemplary Methods

Figure 5:
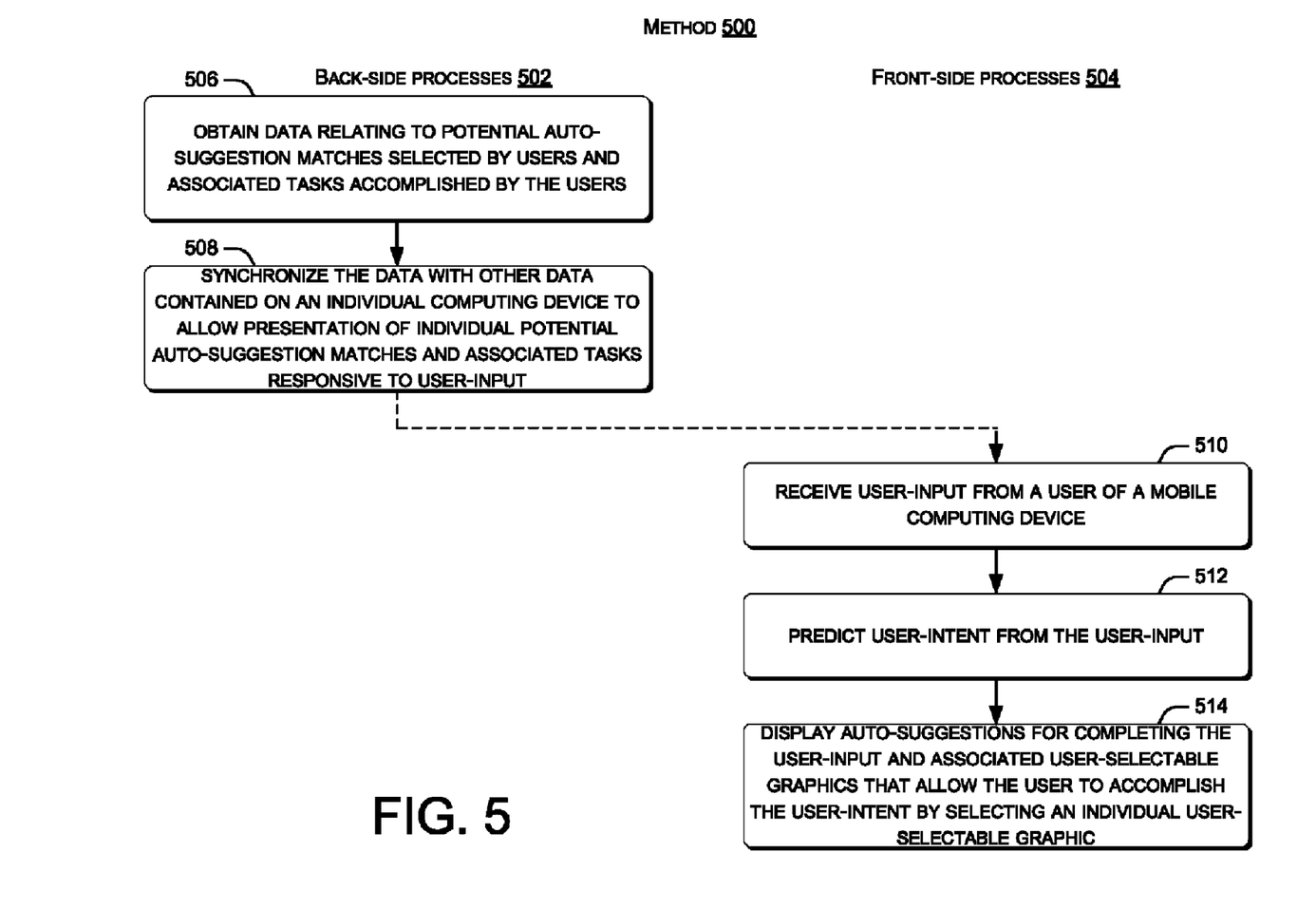
FIG. 5 is a flowchart of task prediction methods in accordance with some implementations of the present concepts.

FIG. 5 illustrates a flowchart of a technique or method 500 that is consistent with at least some implementations of the present concepts. The order in which the method 500 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a processor of the computing device causes the computing device to perform the method.

For ease of explanation, method 500 is described in terms of back-side process 502 and front-side processes 504. This is a logical distinction for explanation purposes only since the front-side and back-side processes can be performed by different computing devices or the same computing device.

At block 506 the method obtains data relating to potential auto-suggestion matches selected by users and associated tasks accomplished by the users.

At block 508 the method synchronizes the data with other data contained on an individual computing device to allow presentation of individual potential auto-suggestion matches and associated tasks responsive to user-input. The other data can relate to user history of the individual computing device and/or user preferences for the individual computing device, among others.

At block 510 the method receives user-input from a user of a mobile computing device.

At block 512 the method predicts user-intent from the user-input.

At block 514 the method displays auto-suggestions for completing the user-input and associated user-selectable graphics that allow the user to accomplish the user-intent by selecting an individual user-selectable graphic. For instance, the auto-suggestions and/or user-selectable graphics can be presented in a ranked manner based upon probability matching.

CONCLUSION

Although techniques, methods, devices, systems, etc., pertaining to offering task shortcuts to satisfy user-intent are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
multiple topic specific dictionaries of potential auto-suggestions for completing a text entry received from a user via user-input;
instructions configured to:
weight and rank at least some of the potential auto-suggestions from the multiple topic specific dictionaries based upon one or more parameters, the one or more parameters comprising at least one user preference parameter or at least one user history parameter,
determine and rank, based on the user-input, tasks that the user may be attempting to accomplish with the user-input,
associate the ranked tasks with the ranked auto-suggestions,
obtain corresponding task shortcuts for the ranked tasks, the task shortcuts comprising graphics selectable by the user to cause actions for accomplishing the ranked tasks, and
present at least some of the ranked auto-suggestions and at least some of the graphics concurrently in response to the user-input so that the user can accomplish an individual ranked task in a single step by selecting an individual graphic corresponding to the individual ranked task; and
a processor configured to execute the instructions.

2. The system of claim 1, wherein the instructions are further configured to consider individual dictionaries selected by the user for inclusion in the multiple topic specific dictionaries.

3. The system of claim 1, embodied as a single computing device.

4. The system of claim 1, wherein the instructions are further configured to, upon user selection of the individual graphic, accomplish the individual ranked task according to defined conditions of a corresponding individual dictionary.

5. The system of claim 1, wherein the instructions are further configured to rank the tasks based on influence by a third party.

6. A hardware computer-readable storage media having instructions stored thereon that when executed by a processor of a computing device cause the processor to perform acts, the acts comprising:
receiving, by the processor, a user-input comprising a text entry entered by a user;
predicting, by the processor, user intent based on the user-input, the predicting comprising:
identifying, from one or more dictionaries, potential auto-suggestions for completing the text entry of the user-input,
ranking the potential auto-suggestions from the one or more dictionaries according to one or more parameters, the one or more parameters comprising at least one user preference parameter or at least one user history parameter,
determining potential tasks that the user may be trying to accomplish with the user-input, the potential tasks having corresponding graphical shortcuts selectable by the user to accomplish the potential tasks, and
selecting individual graphical shortcuts to display to the user with individual ranked auto-suggestions in response to the user-input, the individual graphical shortcuts being selected based on relative probabilities that the user intends to accomplish individual potential tasks corresponding to the individual graphical shortcuts; and
displaying, by the processor, the individual graphical shortcuts and the individual ranked auto-suggestions to the user concurrently responsive to receiving the user-input.

7. The hardware computer-readable storage media according to claim 6, wherein the one or more parameters comprise the at least one user preference parameter.

8. The hardware computer-readable storage media according to claim 7, wherein the at least one user preference parameter indicates the user ranks sports relatively higher than entertainment.

9. The hardware computer-readable storage media according to claim 8, the acts further comprising:
in an instance when the text entry comprises part of both a movie title and a name of a sports team, including the name of the sports team but not the movie title in the individual ranked auto-suggestions that are displayed to the user.

10. The hardware computer-readable storage media according to claim 6, wherein the one or more parameters comprise another parameter relating to behavior of other users.

11. The hardware computer-readable storage media according to claim 10, wherein the another parameter indicates the other users select a first word to autocomplete the text entry more often than a second word to autocomplete the text entry.

12. The hardware computer-readable storage media according to claim 11, wherein the first word is "pizza," the second word is "pirates," and the text entry is "pi."

13. The hardware computer-readable storage media according to claim 6, wherein the one or more parameters comprise a monetization parameter reflecting that a party or entity has paid or will pay to have a first one of the individual ranked auto-suggestions ranked more highly than other individual ranked auto-suggestions.

14. A method comprising:
receiving a user-input comprising a text entry entered by a user;
predicting user intent based on the user-input, the predicting comprising:
identifying, from one or more dictionaries, auto-suggestions for completing the text entry of the user-input,
ranking the auto-suggestions from the one or more dictionaries according to one or more parameters, wherein:
the one or more parameters comprise at least one user preference parameter or at least one user history parameter, and
the one or more parameters provide weighting for the ranking, and determining tasks that the user is likely trying to accomplish with the user-input, wherein the tasks are associated with at least some of the ranked auto-suggestions;

identifying graphical shortcuts that are selectable by the user to accomplish the tasks; and in response to receiving the user-input, concurrently displaying at least:
- a first one of the graphical shortcuts that is selectable by the user to accomplish a first one of the tasks, and
- a first one of the ranked auto-suggestions that is associated with the first task, wherein at least the identifying the graphical shortcuts is performed by a computing device.

15. The method of claim 14, further comprising:
associating the first task with the first ranked auto-suggestion.

16. The method of claim 14, further comprising:
concurrently displaying, with the first graphical shortcut and the first ranked auto-suggestion, at least:
- a second one of the graphical shortcuts that is selectable by the user to accomplish a second one of the tasks, and
- a second one of the ranked auto-suggestions corresponding to the second task.

17. The method of claim 16, wherein the first ranked auto-suggestion and the second ranked auto-suggestion are displayed in ranked order with the first ranked auto-suggestion being ranked higher than the second ranked auto-suggestion.

18. The method according to claim 17, further comprising synchronizing with an update manager to update the one or more parameters.

19. The method according to claim 18, further comprising:
ranking the auto-suggestions again based on the updated parameters with the second ranked auto-suggestion being ranked higher than the first ranked auto-suggestion, and concurrently displaying the first graphical shortcut, the first ranked auto-suggestion, the second graphical shortcut, and the second ranked auto-suggestion again with the second ranked auto-suggestion being displayed in ranked order higher than the first ranked auto-suggestion.

20. The method of claim 16, wherein:
the first graphical shortcut is selectable by the user to call a business associated with the first ranked auto-suggestion, and the second graphical shortcut is selectable by the user to purchase an item associated with the second ranked auto-suggestion.

* * * * *